United States Patent [19]

Herting

[11] Patent Number: 5,047,877
[45] Date of Patent: Sep. 10, 1991

[54] WINDOWING METHOD OF AND APPARATUS FOR ADDRESS MARK DETECTION

[75] Inventor: Kenneth E. Herting, Rush, N.Y.

[73] Assignee: Eastman Kodak Company, Rochester, N.Y.

[21] Appl. No.: 363,800

[22] Filed: Jun. 9, 1989

[51] Int. Cl.$^5$ .......................... G11B 5/09; H03D 3/24
[52] U.S. Cl. ........................................ 360/51; 360/49; 369/49; 375/119
[58] Field of Search ............... 360/51, 53, 49; 369/47, 369/48, 49, 50; 375/108, 113, 9 J, 119; 371/60, 62; 307/510, 517, 518, 527

[56] References Cited

U.S. PATENT DOCUMENTS

| | | |
|---|---|---|
| 3,750,121 | 7/1973 | Lee . |
| 4,319,287 | 3/1982 | Swenson ............................ 360/40 |
| 4,357,707 | 11/1982 | Delury ............................... 360/51 |
| 4,746,997 | 5/1988 | Shrinkle et al. .................... 360/49 |
| 4,752,841 | 6/1988 | Syracuse et al. ................... 360/49 |
| 4,808,884 | 2/1989 | Hull et al. ......................... 360/21 |
| 4,811,317 | 3/1989 | Barnard et al. .................... 358/338 |
| 4,943,985 | 7/1990 | Gherardi ............................ 375/114 |

Primary Examiner—Aristotelis M. Psitos
Assistant Examiner—Varsha V. Sheladia
Attorney, Agent, or Firm—Dennis P. Monteith

[57] ABSTRACT

Apparatus, for preventing false recognition of one or more address marks arranged at predetermined locations in a stream of information-bearing bits played back from a record storage medium, such as a disk, includes a timer, synchronized with the bit stream, for defining a corresponding series of intervals or "windows" relating, respectively, to when each of the address marks is expected to occur in the bit stream. An decoder, responsive to the timer, signals which address mark is expected to occur during each interval defined by the timer. Validation circuitry, responsive to the bit stream, the timer and the decoder, determines whether each address mark expected actually occurs in the bit stream within the corresponding time interval defined by the timer.

7 Claims, 5 Drawing Sheets

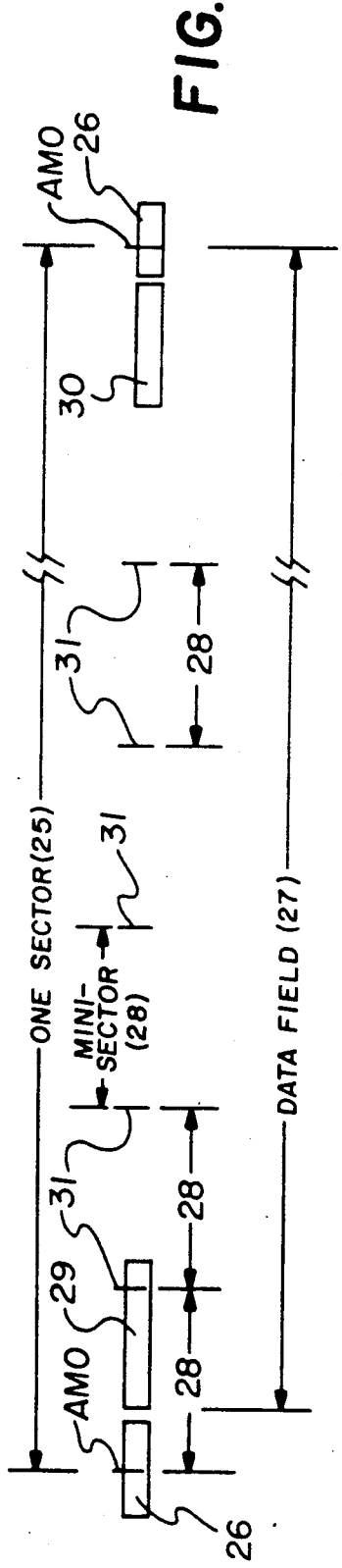
FIG. 2a
FIG. 2b
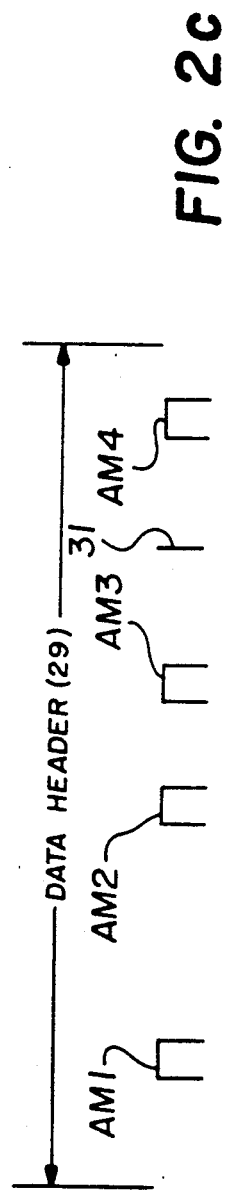
FIG. 2c
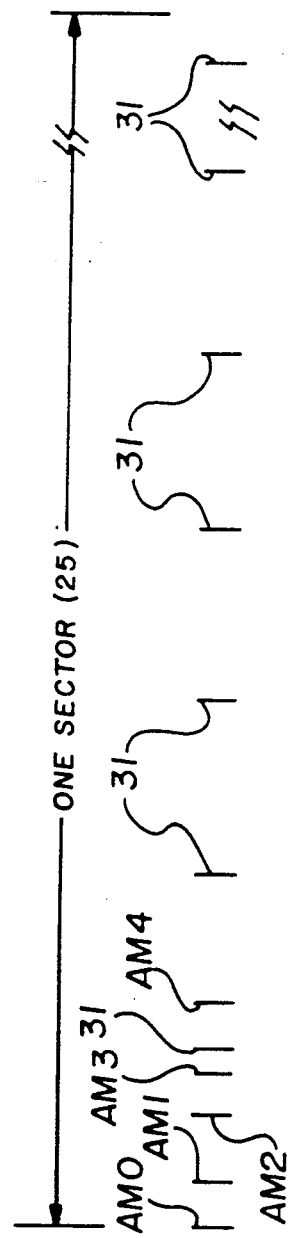
FIG. 2d

WINDOWING METHOD OF AND APPARATUS FOR ADDRESS MARK DETECTION

BACKGROUND OF THE INVENTION

1. Field Of The Invention

The present invention relates generally to digital data recording. More particularly, the invention relates to a method of and apparatus for detecting a predetermined indicium, such as an address mark, within a stream of information-bearing bits.

2. Description Relative To The Prior Art

In the recording of digital information on a record storage medium—magnetic tape, a disk (magnetic, magneto-optical, optical) or an equivalent thereof—bits recorded are systematically arranged for orderly retrieval. With a disk, for example, a record track is divided into a plurality of sectors, each of which contains a predetermined number of bits, which are commonly arranged into two groups. The first group of bits is known as a sector header and the second group, which follows the sector header, is known as a data field. A data field may further be divided into mini-sectors each of which contains a given number of bits.

The term "divided" is somewhat misleading since there may or may not be actual physical separation between two groups of bits. Rather, bits are recorded and/or played back as a continuous, uninterrupted bit stream, while the terms "sector header", "data field", and "mini-sector" merely serve as a convenient means of identifying respective portions of the bit stream.

Either the sector header or the data field, or both, commonly also includes bits corresponding to one or more address marks. An address mark functions advantageously to achieve byte (a set of eight binary bits) synchronization. In particular, an address mark serves for identifying a sector header or the leading edge of a stream of used data bits. Because of the importance of user data, multiple address marks within a given sector serve for redundantly providing byte synchronization.

A well known problem that must be handled in digital data recording is the need to detect an address mark in the stream of binary bits. It is known in the prior art to encode bits representing an address mark using a unique signal, either an MFM or a DMM pattern having one or more normal signal transitions missing. It is intended, of course, that such an address mark will not be mistaken for other information, such as user data, in the bit stream. U.S. Pats. Nos. 3,750,121, 4,319,287 and 4,752,841 disclose an address mark pattern that is different from any other pattern that results when a bit stream is encoded.

A surface defect in the recording medium, however, can cause one or more bits to be in error. Although an encoded address mark pattern may be different from any pattern for other encoded information, an uncorrected error may "look" like an address mark. If this were the case, signal processing apparatus would not be able to process playback data correctly.

SUMMARY OF THE INVENTION

In view of the foregoing, an object of the invention is to provide a method of and apparatus for preventing false recognition of an address mark.

The object of the invention is achieved by providing timer means, synchronized with the speed of an input stream of information-bearing bits, for defining an interval or "window" when an address mark is expected to occur within the bit stream, and "windowing" control circuitry, responsive to the bit stream and the timer means, for detecting the presence of an address mark during the interval defined by the timer means. The term "information-bearing bit" as used herein shall mean and refer to any bit, including a bit representing organizational information, e.g. a sector address, tracking information, address mark, etc., or a bit representing user data, etc.

In a presently preferred embodiment, the invention provides for preventing false detection of any of a plurality of N address marks arranged, respectively, at predetermined locations in a stream of information-bearing bits played back from a record storage medium. To that end, the control circuitry includes disabling means, operable temporarily during a preliminary data-acquisition mode, for overriding the "windowing" function of the control circuit, to facilitate synchronization of the timer means with the bit stream. The timer means then provides for defining a series of sequential intervals each of which corresponds to a "window" when one of the series of N unique address marks is expected to occur within the bit stream.

The control circuitry further includes an decoder, responsive to the timer means, for signaling which one of the series of N address marks is expected to occur in each of the intervals defined by the timer means. A second decoder, responsive to the input bit stream, functions for preliminarily identifying each bit pattern in the bit stream corresponding to an address mark. Time-based comparator circuitry, responsive to the timer means, and the first and second decoders, serves for determining whether a bit pattern, preliminarily identified as an address mark, actually occurred at a time in the bit stream corresponding to when that particular address mark was expected. If the decoders do not "match", or if was expected. If the a match occurs at an inappropriate time in the bit stream sequence, the preliminary identification of an address mark is rejected as an invalid mark.

An advantage of the invention is that an error that causes bits in the input stream to "look" like an address mark is rejected as an address mark.

A further advantage of the invention is that an address mark need not be specially encoded to have a pattern unlike any other pattern in the input bit stream. Any bit pattern, such as a pattern for user data, that actually "looks" like an address mark, will not be flagged as an address mark if it does not occur at the appropriate time in the bit stream.

These advantages of the invention, as well as other advantages, will become more apparent in the detailed description of a preferred embodiment presented below.

DESCRIPTION OF THE DRAWINGS

In the detailed description of a preferred embodiment of the invention presented below, reference is made to the accompanying drawings, in which:

FIG. 2 consisting of a through d illustrates the organization of information recorded on a record track of the disk of FIG. 1;

DETAILED DESCRIPTION OF A PREFERRED EMBODIMENT

Figure 1:
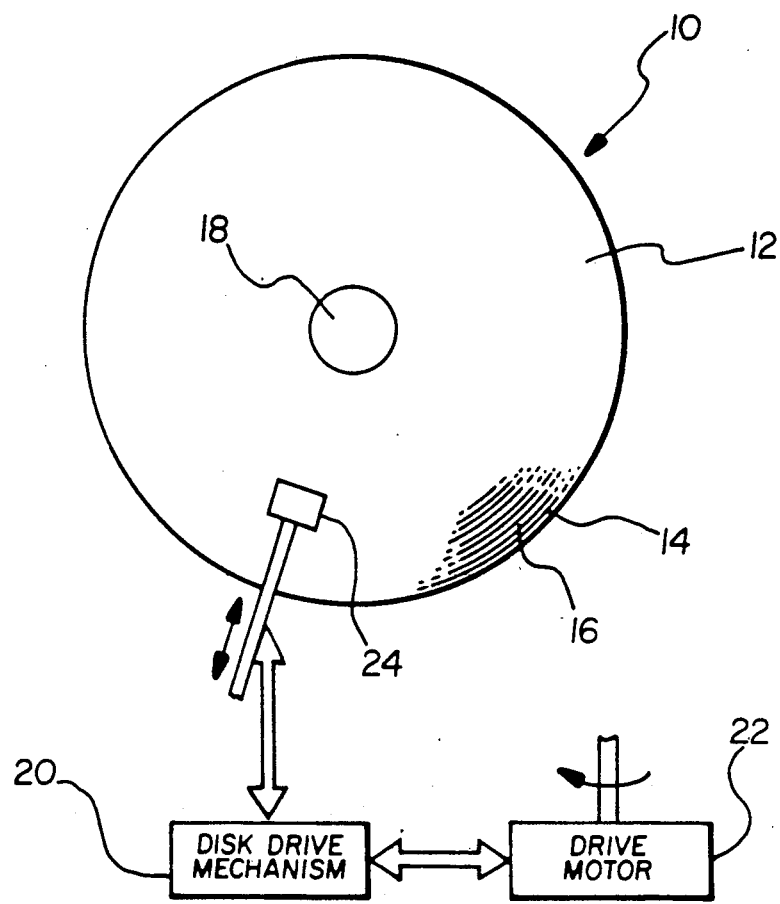
FIG. 1 is a schematic of disk drive apparatus together with an enlarged top view of an information-bearing disk.

FIG. 1 illustrates generally an information-bearing record medium 10 in the form of a disk 12. A recording surface of the disk includes a plurality of equally spaced data storing tracks 14 separated by a relatively narrow guardband 16 which serves to facilitate tracking and to reduce cross talk between the tracks. The tracks 14 are concentric with a central spindle drive aperture 18 of the disk 12 and, as such, may be either circular or in a spiral form. To transfer information (write or read), a drive mechanism 20 causes a spindle drive motor 22 to rotate the disk 12 while a read/write transducer head 24, also under the control of the drive mechanism, traces tracks radially.

In accordance with a widespread standard, each track 14 is divided into a plurality of contiguous sectors 25 (FIG. 2(a)). The sectors serve to divide information on each track into corresponding blocks comprising a predetermined number of bits.

FIG. 2(b) shows that each sector 25 begins with a first group of bits 26, commonly known as a sector header, followed by a second much larger group of bits, referred to herein as a data field 27. In accordance with a presently preferred embodiment, each sector 25 is itself divided into a plurality of contiguous mini-sectors 28, each of which contains a given number of bits. The first mini-sector 28 includes a portion of the sector header 26 and a grouping of bits 29 known as a data header, which spills over into the second mini-sector 28. The usual form of a data field 27 reserves multiple bytes 30 at the end of each sector 25 for error detection and correction of user data to provide a determination as to whether user data was accurately read.

FIG. 2(b) further shows servo tracking information 31 uniformly spaced throughout each sector 25. As is known in the art, servo tracking information, referred to hereinafter as tracking pads, serves to adjust the position of the read/write transducer head 24 relative to a record track 14 for enhancing the signal-to-noise ratio of a data channel. With tracking pads 31 uniformly spaced along a track 14, they further function to collectively provide a clock signal during reading that is synchronized to the bit stream.

An address mark, as described previously herein, serves to identify the location of the beginning of user data within the data field 27. FIG. 2(b) shows that the sector header 26 includes a first address mark (AM0) at a location where a tracking pad 31 normally would be found. FIG. 2(c) shows four additional address marks (AM1, AM2, AM3 and AM4) strategically distributed throughout the data header 29. The collection of five address marks serves to redundantly identify the leading edge of the stream of user data bits in the corresponding field 27.

FIG. 2(d) shows the five address marks in relation to the uniformly distributed tracking pads 31 for a given sector 25.

Preferably, each address mark within a given sector 25 is defined by a unique pattern of signal transitions to readily distinguish the address marks from each other within a sector and from the rest of the bit stream. With a unique address mark, an ambiguity in the bit cell boundary of an address mark pattern still results in the unique pattern of signal transitions being interpreted unambiguously as a particular address mark. The aforementioned U.S. Pat. No. 4,752,841, which is assigned to the assignee of this invention, describes the representation of a plurality of address marks each of which comprises a unique pattern of signal transitions—"illegal" MFM or DMM patterns—that is readily distinguishable from any other address mark pattern and from any other pattern corresponding to an encoded stream of binary bits. It will be understood by those skilled in the art, however, upon reading the detailed description of the invention presented below, that a signal transition pattern for a given address mark need only be "unique" with respect to the other address marks.

Typically, a record medium is preformatted as part of the manufacturing process of a disk, to facilitate the orderly recording and play back of user information. To those ends, each sector header 26, including its address mark (AM0), and the tracking pads 31 are established before any user data bits are recorded. Each data header 29, however, including the four address marks, AM1, AM2, AM3 and AM4, associated with a data header, is recorded at the time user data bits are recorded.

Figure 3:
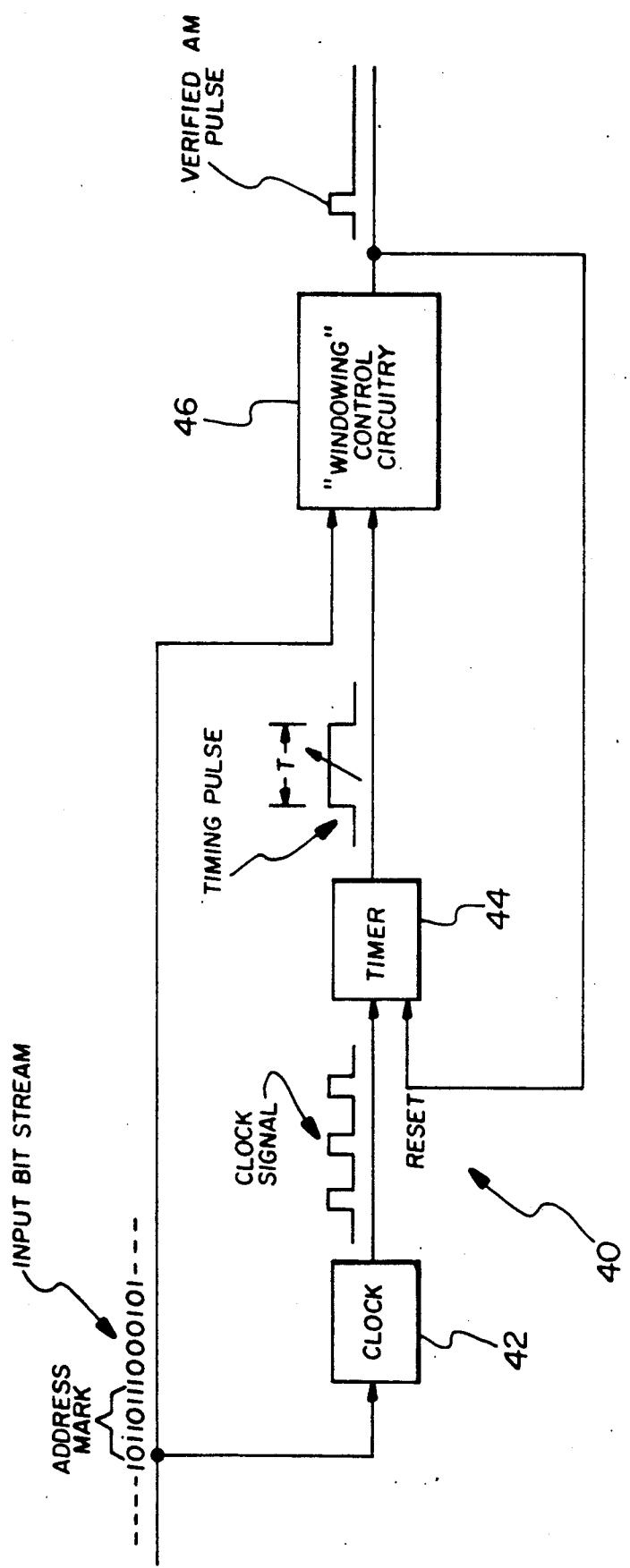
FIG. 3 is a block diagram showing in general address mark verification circuitry in accordance with the invention.

The invention requires a method and apparatus for preventing false identification of an address mark. FIG. 3 shows the invention in general form.

In that regard, a stream of binary bits played back from a record storage medium, preferably a disk, includes a stream of information-bearing bits, such as record-keeping data—clock and phase synchronization bits, tracking pads, sector address, address marks, etc.—as well as user data bits. In accordance with the invention, address mark verification circuitry 40 includes a clock 42, responsive to the bit stream, providing a pulsed CLOCK SIGNAL the frequency of which corresponds to the speed at which information (bits/second) is played back from the storage medium. For that purpose, the aforementioned uniformly spaced tracking pads serve conveniently to cause the clock 42 to produce a clock synchronization signal. U.S. Pat. No. 4,811,317, assigned to the assignee of the present invention and the disclosure of which is incorporated herein by reference, discloses apparatus responsive to prerecorded tracking pads for producing a clock synchronization signal.

A timer 44, responsive to the CLOCK SIGNAL, produces a TIMING PULSE of duration T corresponding to when an address mark is expected in the input bit stream. The timer 44 is reset periodically, preferably in synchronism with the occurrence of a sector header in the bit stream.

"Windowing" control circuitry 46, responsive to the input bit stream and to the TIMING PULSE, functions to detect the presence of an address mark in the input stream in the "window" or interval T defined by the timer 44.

Figure 4:
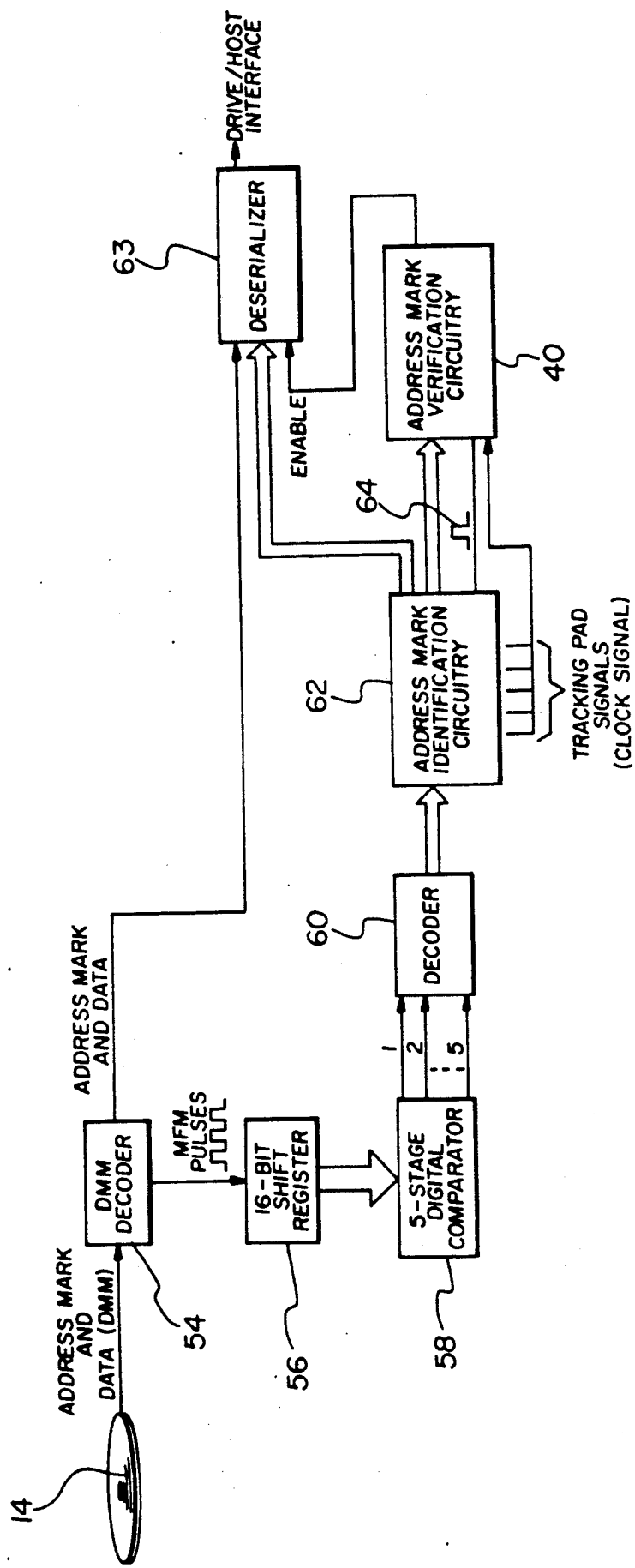
FIG. 4 is a block diagram showing electronics for detecting an address mark read from a disk.

FIG. 4 shows, in block diagram form, address mark verification circuitry 40, in accordance with a presently preferred embodiment, for preventing false detection of any of a plurality of N unique address marks arranged, respectively, at predetermined locations in an input stream of bits. Elements of FIG. 4 that are identical or functionally similar to elements of FIG. 3 are identified by like numerals.

For detecting an address mark, decoder circuitry 54 serves to decode an incoming stream of DMM data and DMM address marks, and thereby convert them into MFM pulses.

A 16-bit shift register 56 receives the train of MFM pulses and clocks them sequentially, in clusters of sixteen, through a 5-stage digital comparator 58. The comparator 58 serves to detect any bit pattern corresponding to an address mark, and to provide a preliminary indication as to which one of the five address marks is detected. To those ends, the comparator 58 consists of five separate comparators each of which is programmed to a unique 16-pulse cluster equal to the pattern of MFM pulses corresponding to a particular one of the address marks. Thus, when a bit pattern corresponding to one of the five address marks is clocked through, the comparator 58 produces an output on the corresponding one of its five outputs.

A decoder 60 serves to produce a 3-bit word corresponding to which one of the five address marks is tentatively detected. Address mark identification circuitry 62, in response to the output of the decoder 60, provides a deserializer 63 with a signal used for timing user data in the data playback channel.

At the same time, address mark identification circuitry 62 provides to the aforementioned address mark verification circuitry 40 both a 3-bit code indicative of the particular address mark preliminarily detected by the comparator 58, and an address mark detect pulse, denoted 64. The circuitry 40, in response to both the CLOCK SIGNAL, derived from the tracking pads 31 on the disk 12, and the preliminary 3-bit address code, then determines whether or not the address mark pattern detected by the comparator 58 is valid. To that end, the circuitry 40, as described previously herein, verifies whether the address mark detected was expected to occur at the time it was detected. If a positive verification is made, the verification circuitry 40 provides an enable signal to the deserializer 63.

The deserializer 63, in response to the enable signal and the signal identifying the address mark detected, defines the byte boundary of the incoming serial bit stream, and converts the serial stream of data into parallel form for transfer to a controller.

Figure 5:
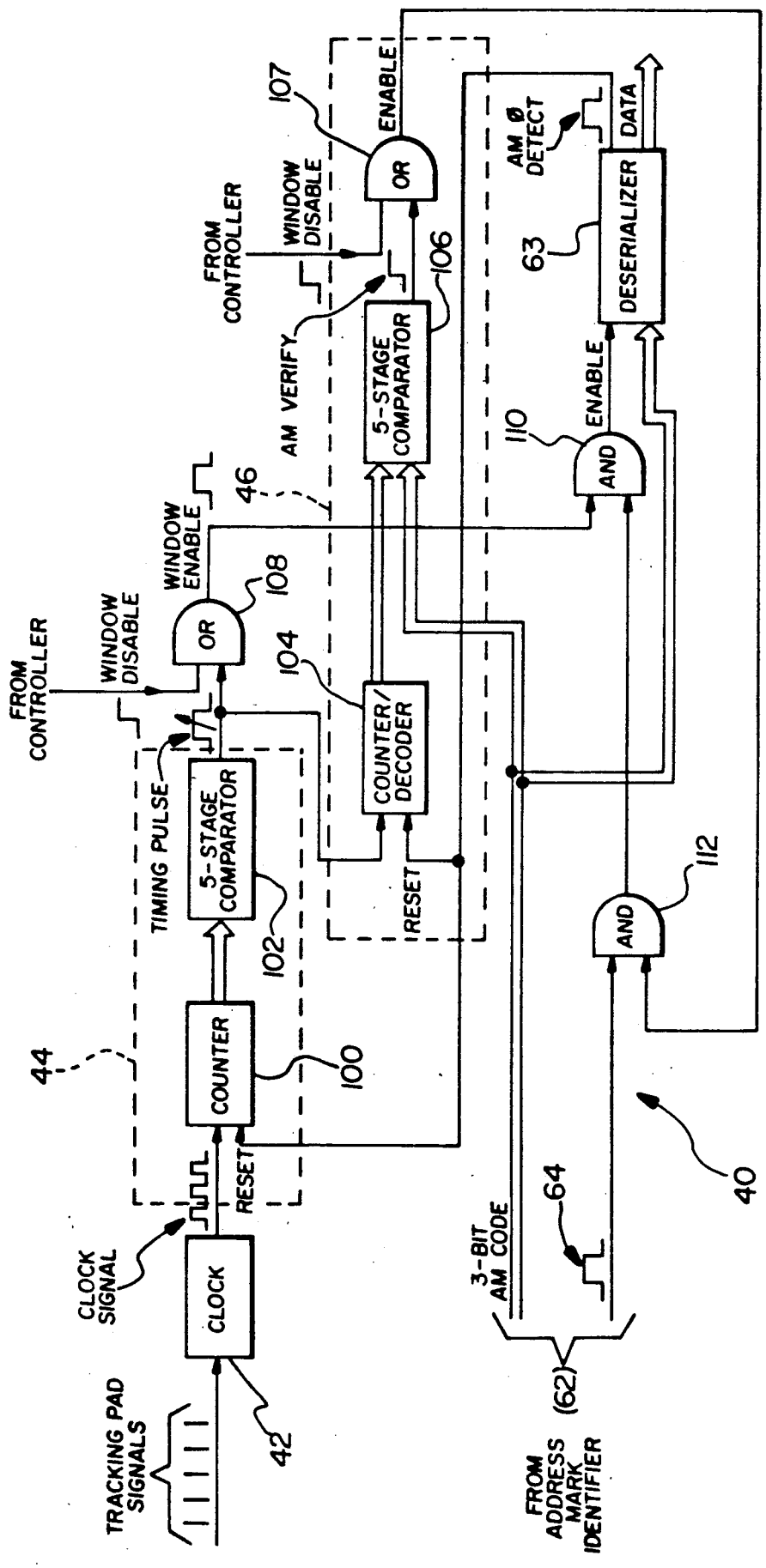
FIG. 5 is a block diagram in further detail showing the address mark verification circuitry of FIG. 3.

FIG. 5 shows the address mark verification circuitry 40 in further detail. The aforementioned timer 44 comprises a first counter 100 serially connected to a single-input 5-stage comparator 102; the "windowing" control circuitry 46 includes a counter/decoder 104, and a dual-input 5-stage comparator 106 serially connected to an OR gate 107.

As described previously herein, the clock 42, in response to the tracking pad signals, produces the CLOCK SIGNAL having a frequency corresponding to the rate at which bits are read from the disk 12 (not shown). The counter 100 serves to provide a count of the number of bytes read from a sector 25 of the disk. In a presently preferred embodiment, each sector has 1260 bytes, arranged into twenty-one mini-sectors 28 of 60 bytes or 480 bits each.

The 5-stage comparator 102 functions to output the aforementioned TIMING PULSE whenever the output of the counter 100 equals any of five different predetermined count values corresponding, respectively, to when each of the five unique address marks are expected to occur in a bit stream. Due to a greater uncertainty as to the occurrence of AM0 in the bit stream, the TIMING PULSE corresponding to AM0 is selected to be approximately 400 nanoseconds long whereas the length of the TIMING PULSE corresponding to address marks one through four (AM1-AM4) is selected to be 300 nanoseconds.

Each TIMING PULSE serves a dual function. One, it causes an OR gate 108 to enable an AND gate 110 for the "window" or interval T corresponding to the expected arrival time of an address mark; two, each TIMING PULSE serves to increment (by one) the count value of the counter/decoder 104.

The counter/decoder 104 functions to provide an output count value corresponding to which particular address mark is expected to occur in the input bit stream. For that purpose, the output of the counter/decoder 104 provides a 3-bit code representing a count from zero through four corresponding, respectively, to AM0 through AM4.

The 5-stage comparator 106 serves to verify that an address mark, detected preliminarily, was the particular AM that was actually expected. In other words, the comparator 106 functions to reject any preliminary detection of an address mark unless that address mark was expected to occur at the time it was detected. In doing so, the comparator 106 causes verification circuitry 40 to reject or to purge an invalid address mark such as would occur if a defect on the recording surface of disk 12 caused an error pattern in the bit stream to "look" like an address mark bit pattern.

For that purpose, the comparator 106 receives a 3-bit code from the address mark identification circuitry 62 corresponding to the address mark pattern preliminarily detected. When both 3-bit input codes are the same, the comparator 106 produces an AM VERIFY signal. The OR gate 107, in response to the AM VERIFY signal, enables a dual-input AND gate 112.

The second input of the AND gate 112 is arranged to receive the aforementioned address mark detect pulse 64 from the AM identification circuitry 62. The output of the AND gate 112 serves to drive the AND gate 110 when it is already enabled by the timer 44. The AND gate 110, in turn, functions to allow a verified address mark to effect byte synchronization in the deserializer 63.

Thus, when the comparator 106 verifies that an address mark detected is of the proper type, i.e. the respective outputs of the counter/decoder 104 and the address identifier circuitry 62 "match", and, at the same time, the address mark detected was actually expected, i.e. the timer 44 enabled the AND gate 110 at the time the "match" occurred, the deserializer 63 is signalled for a byte boundary of the data stream. For that purpose, the deserializer 63 receives the aforementioned 3-bit AM code from the circuitry 62 identifying which address mark was detected. Address mark identification enables a drive-host interface (not shown) to identify the number of input stream bytes to be received prior to the actual leading-edge boundary of user data. Additionally, each time address mark zero (AM0) is detected and verified, the deserializer 63 resets the counters 100 and 104.

The AM verification circuitry 40 is initialized during a preliminary data-acquisition mode, e.g. during a track-seek operation when the read/write transducer head 24 (FIG. 1) moves radially from one record track 14 to any other track. More specifically, the circuitry 40 is initialized during the latter stages of a track-seek operation, i.e. when the travel time remaining for the transducer head 24 to reach its destination track is less than a predetermined time interval (approximately 10 milliseconds).

To that end, sector addresses, which are numbered sequentially, read from the disk 12 by the transducer head 24 enable the disk drive mechanism 20 to monitor the position of the head 24 relative to its destination track. During the initial phase of a track-seek operation, when more than a given number of sectors 25 remain to be read, the controller supplies a positive-going WINDOW DISABLE signal to respective inputs of the OR gate 108 and the OR gate 107, thereby enabling the AND gate 110 and the AND gate 112, respectively. By so doing, the address verification circuitry 40 is overridden. That is, whenever the 5-stage comparator 58 tentatively detects a bit pattern corresponding to any of the five address marks, the corresponding AM detect pulse 64, produced by the identification circuitry 62, is gated through the AND gate 112 and the AND gate 110, thereby enabling the deserializer 63 to achieve byte synchronization without address mark verification. Each time the deserializer 63 receives a signal that address mark zero was detected, an AM0 pulse resets the counters 100 and 104.

When fewer than a given number of sectors 25 remain to be read during a track-seek, however, the controller removes the WINDOW DISABLE signal from the respective inputs of the OR gate 108 and the OR gate 110. The address verification circuitry 40 is no longer overridden, and an address mark now is only responded to when it is verified as having been detected during the time interval that Particular address mark is expected to occur.

ADVANTAGEOUS TECHNICAL EFFECT

From the foregoing, it is apparent to those skilled in the data recording art that address mark verification circuitry, in accordance with the invention, provides for preventing the false detection of an address mark. In particular, the verification circuitry serves for preventing an error pattern, having the appearance of an address mark, from being identified as a valid address mark whenever the error pattern occurs at a time in an input bit stream when an address mark is not scheduled to occur.

The invention has been described in detail with reference to the figures, however, it will be appreciated that variations and modifications are possible within the spirit and scope of the invention.

What is claimed is:

1. Apparatus for preventing false detection of a predetermined indicium in a stream of information-bearing bits played back from a record storage medium, said apparatus comprising:
   a) timer means, responsive to the number of bits in the binary bit stream played back from the storage medium, for defining an interval encompassing a particular time that the predetermined indicium is expected to occur within the bit stream; and
   b) control circuitry, responsive to an output of said timer means and the bit stream, for detecting the presence of the predetermined indicium during the interval defined by said timer means.

2. Apparatus for preventing false detection of an address mark in a stream of information-bearing bits played back from a record storage medium, said apparatus comprising:
   a) timer means, responsive to the number of bits in the binary bit stream played back from the storage medium, for defining an interval enclosing a particular time that an address mark is expected to occur within the bit stream; and
   b) control circuitry, responsive to an output of said timer means and the bit stream, for detecting the presence of an address mark during the interval defined by said timer means.

3. Apparatus for preventing false detection of any of a plurality of N address marks arranged, respectively, at predetermined locations in a stream of information-bearing bits played back from a record storage medium, said apparatus comprising:
   a) timer means, synchronized with the binary bit stream, for defining a series of N sequential non-overlapping intervals each of which encompasses a particular time when one of the series of N address marks is expected to occur within the bit stream;
   b) a decoder, responsive to said timer means, for signaling which one of the series of N address marks is expected to occur in each of the intervals defined by said timer means; and
   c) validation circuitry, responsive to the bit stream, said timer means and said decoder, for determining sequentially whether each address mark expected to occur in the bit stream actually occurs in the bit stream within the corresponding time interval defined by said timer means.

4. Apparatus for preventing false detection of any of a plurality of N address marks arranged, respectively, at predetermined locations in a stream of information-bearing bits played back from a record storage medium, said apparatus comprising:
   a) timer means, synchronized with the binary bit stream, for defining a series of sequential intervals each of which encloses a particular time when one of the series of address marks is expected to occur within the bit stream;
   b) a decoder, respective to said timer means, for signaling the sequence in which each of the N address marks is to occur in the bit stream;
   c) indicator circuitry, responsive to the bit stream, for providing a preliminary signal corresponding to the detection of a particular address mark in the bit stream; and
   d) validation circuitry, responsive to said indicator circuitry, said decoder, and said timer means, for determining (1) whether the particular address mark preliminary identified occurred in proper sequence relative to the other address marks in the bit stream, and (2) whether the address mark, preliminarily identified, occurred during the corresponding interval defined by said timer means.

5. A method of preventing false detection of a predetermined indicium in a stream of information-bearing bits played back from a record storage medium, said method comprising:
   a) defining an interval, in response to the number of bits in the bit stream played back from the storage medium, encompassing a particular time when the predetermined indicium is expected to occur during play back of the bit stream; and
   b) detecting the presence of the predetermined indicium in the bit stream during the interval the address mark is expected to occur.

6. A method of preventing false detection of an address mark in a stream of information-bearing bits played back from a record storage medium, said method comprising:

a) defining an interval, in response to the number of bits played back from the storage medium, that encloses a particular time when the address mark is expected to occur during play back of the bit stream; and b) detecting the presence of the address mark in the bit stream during the interval the address mark is expected to occur.

7. A method of preventing false detection of any of a plurality of N address marks arranged at predetermined locations in a stream of information-bearing bits played back from a record storage medium, said method comprising:

a) defining a series of N intervals corresponding, respectively, to when each of the series of N address marks is expected to occur in the bit stream;

b) providing a signal identifying which one of the series of N address marks is expected to occur in each of the N series of intervals; and c) determining whether each address mark expected to occur in the bit stream actually occurred in the bit stream within the corresponding interval.

* * * * *